US007840056B2

(12) United States Patent
Mukai

(10) Patent No.: US 7,840,056 B2
(45) Date of Patent: Nov. 23, 2010

(54) PAPER SHEET PROCESSOR

(75) Inventor: Masanori Mukai, Inagi (JP)

(73) Assignee: Fujitsu Limited, Kawasaki (JP)

( * ) Notice: Subject to any disclaimer, the term of this patent is extended or adjusted under 35 U.S.C. 154(b) by 873 days.

(21) Appl. No.: 11/275,022

(22) Filed: Dec. 2, 2005

(65) Prior Publication Data

US 2007/0018382 A1 Jan. 25, 2007

(30) Foreign Application Priority Data

Jul. 25, 2005 (JP) ............................ 2005-213599

(51) Int. Cl.
*G06K 9/00* (2006.01)
*G06K 9/74* (2006.01)

(52) U.S. Cl. ......................... 382/135; 356/71; 382/137; 382/138

(58) Field of Classification Search ................. 382/135; 356/71; 235/379; 250/200; 209/534
See application file for complete search history.

(56) References Cited

U.S. PATENT DOCUMENTS 6,741,727 B1 * 5/2004 Hirasawa .................... 382/112
6,950,114 B2 * 9/2005 Honda et al. ................ 345/626
2006/0066882 A1 * 3/2006 Yamauchi et al. ............ 358/1.9
2007/0258633 A1 * 11/2007 Jones et al. ................. 382/135

FOREIGN PATENT DOCUMENTS

| | | |
|---|---|---|
| JP | 53-100895 | 9/1978 |
| JP | 59-160284 | 9/1984 |
| JP | 6-25122 | 9/1994 |
| JP | 6-251222 | 9/1994 |
| JP | 2000-182115 | 6/2000 |
| JP | 2002-373357 | 12/2002 |

OTHER PUBLICATIONS

Japanes Office Action issued on Feb. 10, 2009 in corresponding Japanese Patent Application 2005-213599.

* cited by examiner

*Primary Examiner*—Anand Bhatnagar
*Assistant Examiner*—Randolph Chu
(74) *Attorney, Agent, or Firm*—Staas & Halsey LLP

(57) ABSTRACT

In a paper sheet processing apparatus comprising a function for determining the state of a paper sheet, an optical sensor generates template data by optically reading the state of an input paper sheet. A template data unit stores template data of a paper sheet. An image processing unit corrects gradation data of the whole paper sheet based on the gradation data of a predetermined area of the paper sheet obtained by the optical sensor. Based on comparison of the corrected gradation data with the template data, the state of the paper sheet is determined.

7 Claims, 7 Drawing Sheets

PAPER SHEET PROCESSOR

BACKGROUND OF THE INVENTION

1. Field of the Invention

The present invention relates to a technology for determining the state of a paper sheet such as a paper currency.

2. Description of the Related Art

In a paper sheet processor for processing a paper sheet such as a paper currency, conventionally, a technology for dividing the whole paper sheet into infinitesimal areas first, and for utilizing an electrical signal of each infinitesimal area obtained from an optical sensor or a thickness sensor etc. is used for measuring the shading of the pattern, the shape and other characteristics of the paper sheets. The sensor-measured value obtained by such a technology is converted into a gradation signal and then is stored. A conversion into a gradation signal with 256 gradations is applied, for example. The authenticity and the extent of damage are determined by performing image processing to the gradation signal and by comparing the data after image processing with pre-prepared template data (template).

The template data comprises values, which are considered a reference in various determinations, such as a set of data to which the gradation is set. Here, the template data used in the above determinations is prepared to be of the same number as the number of combinations of types, sides (both) and the feed directions that the paper sheet is fed into the device. In other words, for one type of paper currency, (a surface of the side read by a sensor: two combinations from two sides) .times.(the direction fed into the device: two combinations from forward and backward directions)=4 combinations of the template data is prepared.

In the above paper sheet processor, in order to facilitate the comparison of the template data with the data obtained from an actual paper sheet, the obtained data may be corrected. When, for example, the average gradation of a paper sheet is smaller than that of the template data due to a contamination on the paper sheet, the value of each infinitesimal area is corrected so that the average value reaches the same brightness as that of the template data.

FIG. 1 is a diagram explaining a conventional data correction method. An explanation of the correction method is provided using specific numeric values with reference to FIG. 1. Assume that the average color density of the template data, which is the reference, is "100" in 256 gradation levels for simplicity in the following explanation.

First, a case that a paper sheet with darker color as a whole due to contaminations etc. is fed into the paper sheet processor is examined. In this case, suppose that actual data 61 is obtained from the fed paper sheet. The average gradation of the actual data 61 is "80", which is lower than the reference template data. In order to compare the actual data 61 with the template data 63, in which the average gradation is "100", corrected data 62 is obtained by multiplying the actual data 61 by a coefficient "100/80". The average gradation of the corrected data 62 is 80.times.(100/80)=100. For each infinitesimal area, the corrected data 62 and the template data 63 are compared, and the authenticity etc. of the paper sheet determined.

Next, a case that a paper sheet, which is darker in part due to contaminations etc., is fed is examined. Suppose that actual data 64 is data obtained from a paper sheet of which about ½ of the whole paper sheet area is contaminated. Within the actual data 64, an area A has the average gradation of "20" due to heavy contamination, and an area B with its average gradation of "80" has less contamination than the area A.

For actual data 64 associated with such conditions, the average density of the actual data 64 is (20+80)/2=50. At that time, in the same way as the above procedure, corrected data 65 corrected from the actual data 64 has an area A with its gradation of 20.times.(100/50)=40 and an area B with its gradation of 80.times.(100/50)=160. Using the corrected data 65, comparison with the above template data 63 is performed.

In addition to the above method, as described in Japanese laid-open Patent Application Publication No. S59-160284, Japanese laid-open Patent Application Publication No. 2000-182115 and Japanese laid-open Patent Application Publication No. S53-100895, there is another method in which image processing is performed on a prescribed area of paper sheet image data, and the state of the paper sheet is determined. In such a method, adjustments such as weighting of a part where a watermark etc. is arranged on a paper sheet or gain of the output signal of a scanner scanning the part is performed.

The above method, which corrects the average gradation of a whole paper sheet so that the average gradation of the whole paper sheet corresponds to that of the reference template data ("100" in above example), corrects the whole uniformly even in a case that the actual data 64 in FIG. 1 in which an area A where the gradation is extremely low is partially present. For that reason, the relatively bright area B has an excessively high gradation compared with the template data because of the correction, and the authenticity etc. of the paper sheet may not be determined correctly.

In the case that a paper sheet is contaminated over a wide area as in the actual data 61 in FIG. 1, when the average gradation is corrected to "100", that the entire paper sheet is contaminated may not be recognized. In other words, the paper sheet is a contaminated paper sheet to be collected by the device under normal conditions; however the paper sheet is not recovered, and is to be withdrawn by a user etc. of the device.

SUMMARY OF THE INVENTION

It is an object of the present invention to provide a technology, which allows the above problems to be solved and the determination of the state of paper sheets correctly.

In order to solve the above problems, the present invention is a paper sheet processing apparatus with a function for determining a state of a paper sheet, comprising an optical sensor for generating gradation data by optically reading the state of an input paper sheet, storage unit for storing template gradation data of the paper sheet, correction unit for, based on the gradation data of a predetermined area in the paper sheet obtained by the optical sensor, correcting the gradation data of the whole paper sheet, and state determination unit for determining the state of the whole paper sheet based on the comparison of the corrected gradation data and the template gradation data.

Correction of gradation data is performed on the whole paper sheet on the basis of gradation data of a prescribed area obtained by the optical sensor. If the prescribed area is selected appropriately, appropriate gradation data can be obtained throughout the whole paper sheet, and therefore, appropriate comparison with the template gradation data can be performed.

The correction unit may calculate a correction coefficient so that the gradation data of a prescribed area in the paper sheet obtained by the optical sensor corresponds to a predetermined reference value, and multiply the correction coefficient by the gradation data of the whole paper sheet. And the template gradation data may be generated from an unused paper sheet by the optical sensor, and the state determination unit determines a contamination of the paper sheet by taking the difference between the template gradation data and the corrected gradation data in infinitesimal area unit.

In addition, the state determination unit, when an area where the gradation data obtained from the correction is darker than the template gradation data is approximately linear and is longer than a prescribed length, may determine that the area constitutes a fold line of a paper sheet. It is possible to distinguish a contamination from a fold line of the paper sheet, and therefore, the paper sheet can be appropriately processed.

Moreover, calculation unit for calculating the amount of contamination based on the determination of the state determination unit and processing determination unit for determining whether the paper sheet should be recovered or not based on the calculated amount of contamination may be further comprised. It is possible to determine the state of the paper sheet with improved accuracy regarding the contamination.

According to the present invention, because the state of a paper sheet can be determined accurately, the accuracy of authenticity determination is improved, and contaminated paper sheets can be unfailingly recovered.

DESCRIPTION OF THE PREFERRED EMBODIMENT

In the following description, details of the preferred embodiments of the present invention are explained with reference to the drawings.

Figure 1:
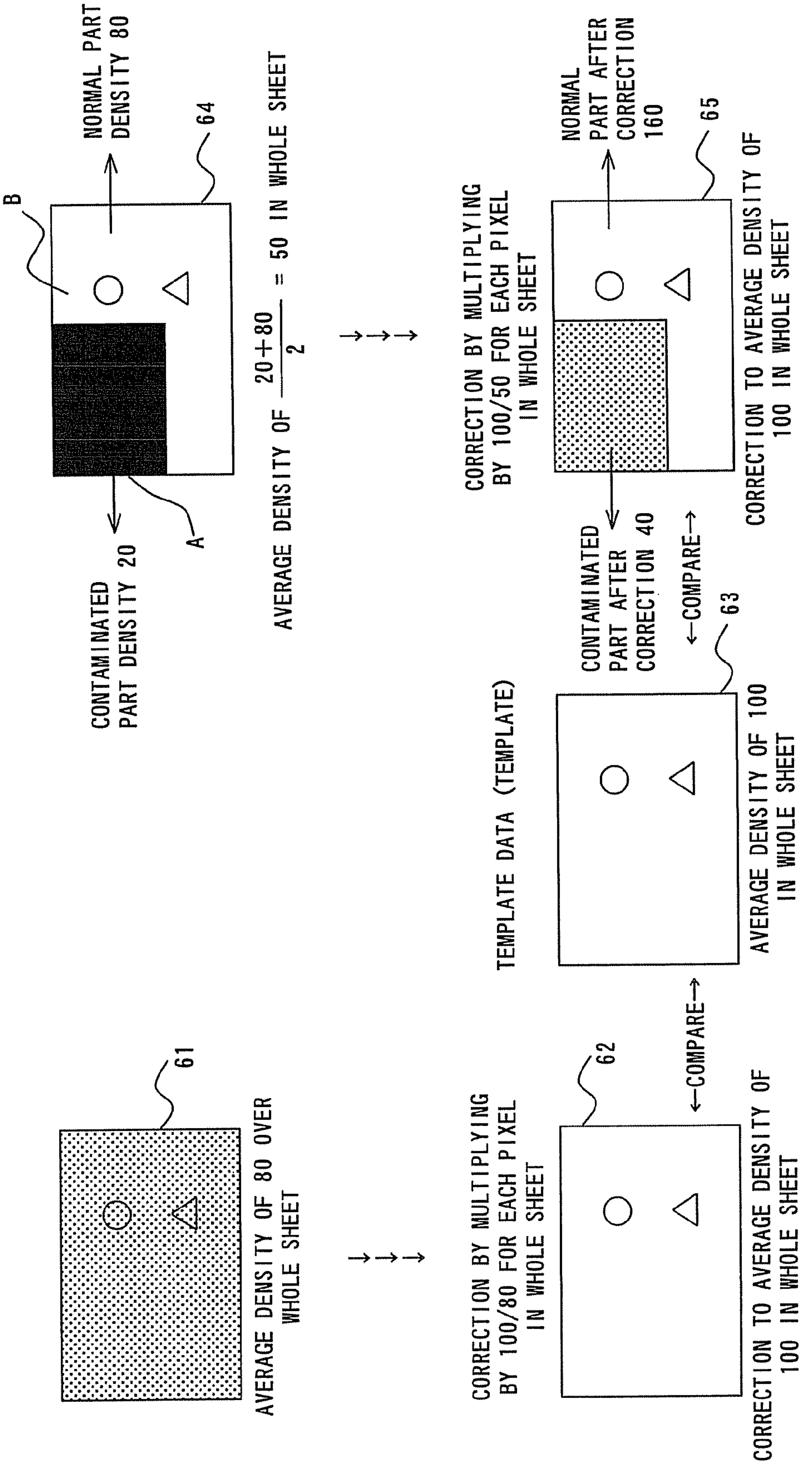
F I G. 1 PRIOR ART
FIG. 1 is a diagram explaining a conventional data correction method.
Figure 2:
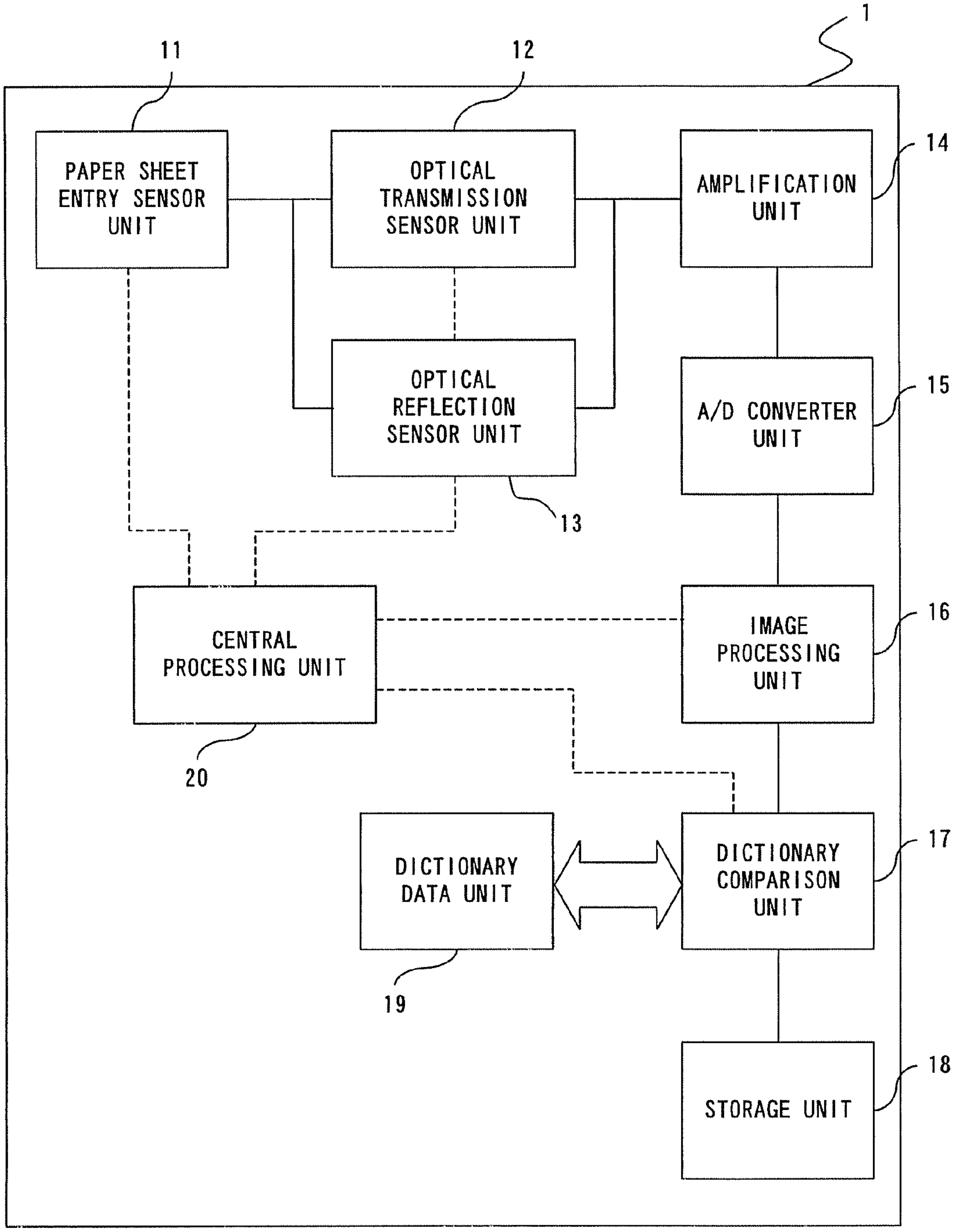
FIG. 2 is a block diagram showing a configuration of a paper sheet processor relating to the present invention.

FIG. 2 is a block diagram showing a configuration of a paper sheet processor relating to the present invention. The paper sheet processor 1 comprises a paper sheet entry sensor unit 11, an optical transmission sensor unit 12, an optical reflection sensor unit 13, an amplification unit 14, an A/D conversion unit 15, an image processing unit 16, a dictionary comparison unit 17, a storage unit 18, a template data unit 19 and a central processing unit 20.

The paper sheet entry sensor unit 11 detects a paper sheet fed into the paper sheet processor 1 by a user etc. In the following description, suppose that a paper currency is fed as an example of a paper sheet. The optical transmission sensor unit 12 and the optical reflection sensor unit 13 generate image data of the fed paper sheet from the optical transmission and the optical reflection, respectively, when the paper sheet is irradiated. Based on the received optical signal detected by the sensors, a watermark and two sides of the paper sheet such as a paper currency are determined. The amplification unit 14 amplifies the signal obtained in the optical penetration sensor unit 12 and in the optical reflection sensor unit 13. The A/D converter unit 15 converts the amplified signal into a digital signal. The digital data is obtained as, for example, gradation data in pixel units (or color density data) for each unit when the paper sheet is divided into infinitesimal areas.

The image processing unit 16 performs various image processing including the image processing relating to the present invention, which is determination of the authenticity or determination of the presence of contaminations based on the image data obtained from the fed paper currency. The dictionary comparison unit 17 performs comparison between the template data, which is a template stored in the paper sheet processor 1 in advance, and the obtained image data. The storage unit 18 stores image data etc. after correction, as explained below, in addition to the obtained image data. The template data unit 19 stores the template data, which is a template. The central processing unit 20 controls operations of each of the above sensors and processor units.

The paper sheet processor 1 relating to the present embodiment shown in FIG. 2 performs recognition of the contamination on a paper currency and determination of the authenticity of the fed paper currency by executing appropriate processing in accordance with image data obtained from the fed paper currency in the image processing unit 16. In the following description, a processing method of image data of the paper sheet processor relating to the present embodiment is explained.

Figure 3:
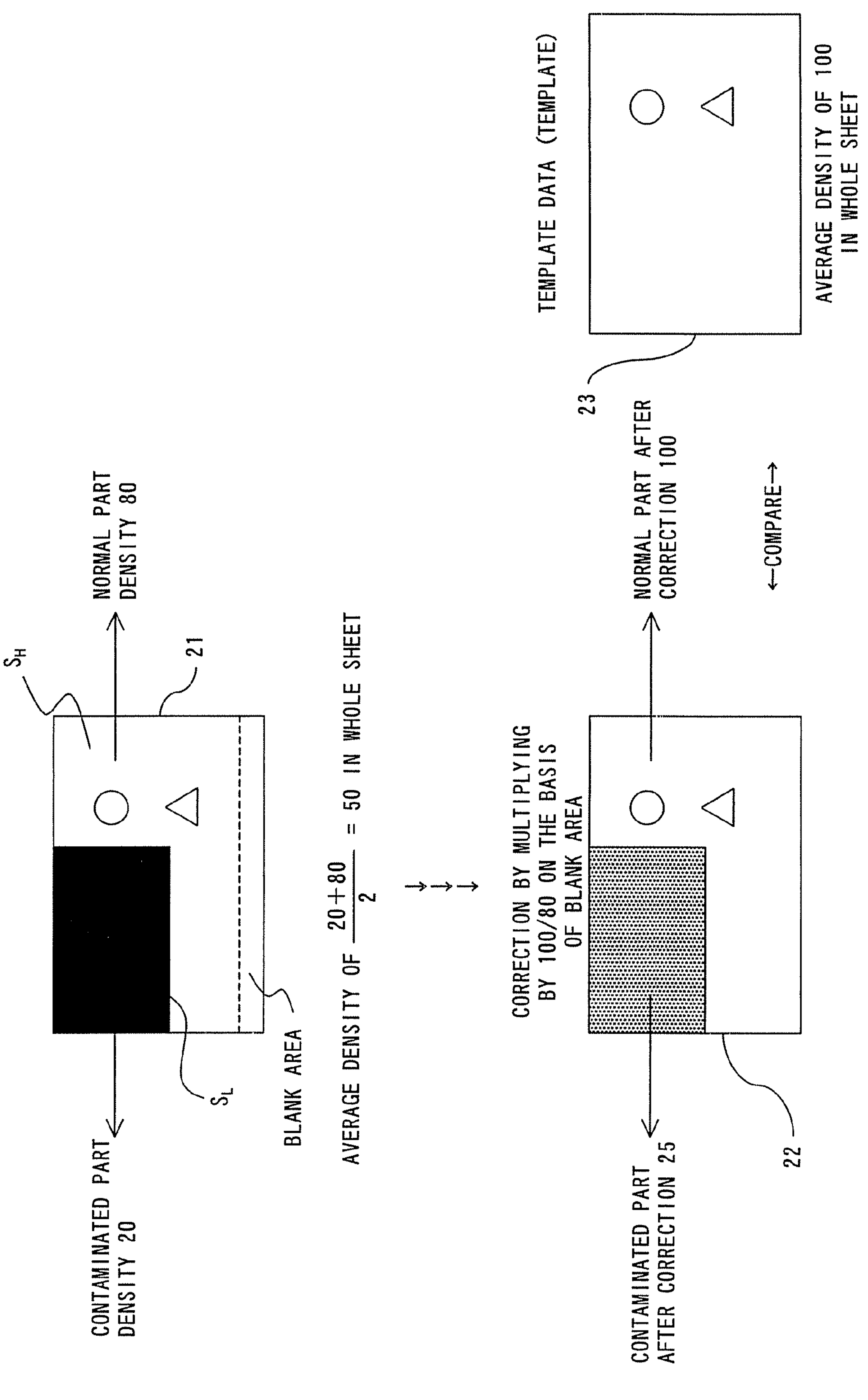
FIG. 3 is a diagram explaining a correction method of image data relating to the present embodiment.

FIG. 3 is a diagram explaining a correction method of image data relating to the present embodiment. For the purpose of explanation, in an example in FIG. 3, image data 21 (hereinafter referred to as actual data) obtained from a paper currency, which is actually fed, has a low gradation over about ½ of the whole area, and has relatively high gradation over the rest of the ½. In the actual data 21, suppose an area with a low gradation is an area S.sub.L, and an area with a high gradation is an area S.sub.H. In the correction method relating to the present embodiment, first, a correction coefficient is calculated on the basis of the gradation of a prescribed area of the actual data 21, and the image data of the whole paper currency is corrected using the correction coefficient. At that time, the correction coefficient can be obtained by, for example, comparing the gradation of the above prescribed area (or average gradation of the prescribed area) with the gradation of the area corresponding to the template data 23.

The above prescribed area is, for example, a blank area in the margin of a paper currency. In other words, a uniformly high gradation is expected in the blank part of the margin of a paper currency unless there is a scrawl or contamination. Therefore, in the example of FIG. 3, the correction on the basis of the blank part of a paper currency is explained.

The gradation of the blank part of the actual data 21 is 80, and the gradation of the blank part of the template data 23 is 100. Then, the whole actual data 21 is corrected by multiplying the gradation by 100/80. The corrected data 22 in FIG. 3 is image data obtained by multiplying the whole actual data 21 by the correction coefficient "100/80". For the low gradation area S.sub.L, the gradation after the correction is 20.times.(100/80)=25. However, for the high gradation area S.sub.H, the gradation after the correction is 80.times.(100/80)=100. The corrected data 22 obtained in the above manner is compared with the template data 23, and various determinations on the state of the paper currency are performed.

In the example in FIG. 3, the area S.sub.L in the corrected data 22 has a lower gradation compared with the gradation of 100 of the area S.sub.L in the template data 23, and therefore, it is estimated that the area is contaminated. In the paper sheet processor 1 of the present embodiment, though details are explained later, it is further possible to determine whether the lower gradation in the area S.sub.L compared with that of the template data 23 is attributed to contamination, a crease of the paper currency, authenticity or other characteristics.

The template data 23 used in the present embodiment may be image data obtained by the optical sensors 12 and 13 when a new paper currency is fed into the paper sheet processor 1 relating to the present embodiment, for example. Alternatively, data of the gradation of a paper currency obtained by other devices etc. may be stored in the paper sheet processor 1, or data may be read out from the external device.

The above example of the correction uses the gradation of the blank part of a paper currency for calculating the gradation coefficient; however, it is not limited to the above method. For example, use of a part of a paper currency printed in order to prevent counterfeiting may be used. The part to be used in this example would be a part to which a technology such as a watermark, a hologram, a security thread, braille, pearl ink, a latent image pattern, special luminous ink, a watermark barcode or others are used. These areas can be used instead of the blank area or may be used when the blank area is contaminated. A part where a technology, which is relatively less subject to contamination such as a hologram, is applied can be used as a relatively stable correction reference regardless of whether the currency is worn etc.

As described above, according to the paper sheet processor 1 relating to the present embodiment, a whole image data is corrected on the basis of an area, which is not contaminated or is less subject to contamination, and the corrected image data is compared with the template data. For that reason, even for a paper currency with an area of low gradation in portion, its gradation is corrected on the basis of a part where the gradation is approximately stable, the whole is, consequently, corrected to an appropriate gradation, and therefore, the position of the contamination (the pixel coordinate) and the amount of the contamination (gradation) can be determined with further accuracy.

As stated above, on the basis of a prescribed area of the actual data 21 obtained from a paper currency, the entire actual data 21 is corrected by its ratio to the corresponding area in the template data 23, and then, the corrected data 22 is obtained. Various determinations of the state of the paper currency are performed by the comparison of the corrected data 22 and the template data 23. In the following description, a method for determining the state of a paper currency from the corrected data 22 is explained.

Figure 4:
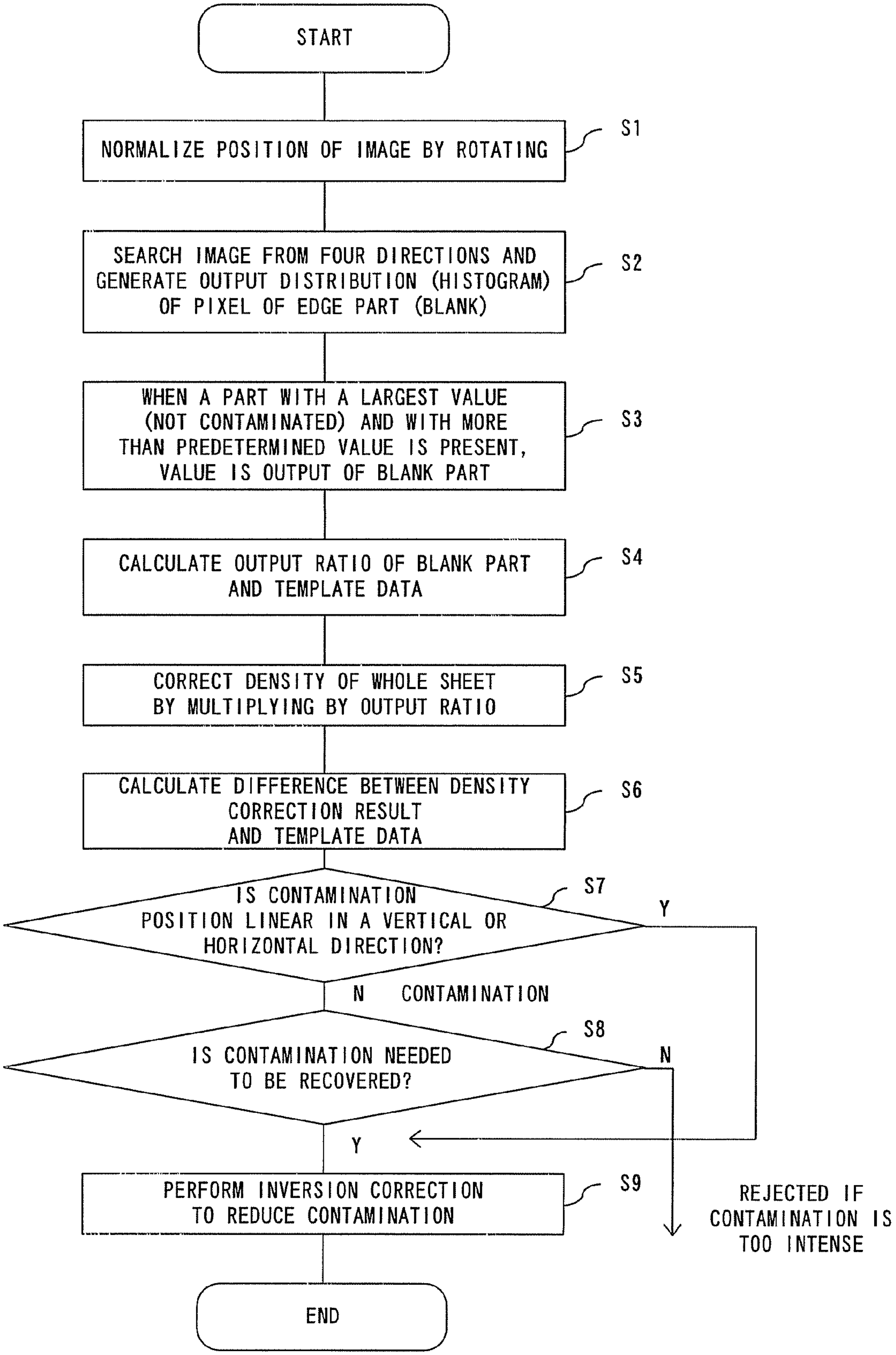
FIG. 4 is a flowchart of processing for determining the state of a paper currency.

FIG. 4 is a flowchart of processing for determining the state of a paper currency. With reference to the flowchart in FIG. 4, processing for determining the state of a paper currency by correcting image data using a blank part of the paper currency is explained.

First, in step S1, the orientation of a fed paper currency is normalized by rotating the obtained image data. At that time, when an area corresponding to the paper currency, that is an actual data area of the paper currency, is determined from image data obtained from the optical sensor 12, the position coordinate of the actual data is fixed on a plane. Next in step 2, an output distribution for each pixel of the area corresponding to the blank part of the paper currency is generated. Here, the position and the shape of the blank part of the paper currency are included in the template data in advance. In this description, a case of using four sides and four corners of the paper currency as blanks is explained as an example. In such a case, the output distribution to be generated can be obtained by extracting image data, which corresponds to each of four blanks of a paper currency.

In step S3, based on the above obtained output distribution, areas with a highest gradation of the four searched areas are selected as areas to be a correction reference. When all of the four areas have their gradation values smaller than a predetermined value; that is in the case that the intensity of contamination of the four blanks is high, none of the blank parts are used as a reference. In such a case, if it is determined in this step whether any of the blank parts is suitable for a correction reference, though not shown in the flowchart in FIG. 4, it is possible to proceed with the processing by using other parts such as a watermark or a hologram as a correction reference.

In step S4, an output ratio of the blank part determined as a correction reference to the part corresponding to the blank part in the template data, that is a gradation ratio (correction coefficient), is calculated. In step S5, based on the obtained ratio, the whole actual data is corrected. In step S6, the corrected data and the corresponding template data are compared throughout the paper currency, and the difference for each pixel is calculated. Here, an area where the result of subtraction of the corrected data from the template data is a positive value represents a darker image compared with the template data.

In step S7, whether the dark part detected in step S6 is due to contamination or due to a fold line is determined. In other words, when the darker area compared with the template data is linear or approximately linear extending in a prescribed direction (a vertical direction or a horizontal direction of a paper currency, for example) and longer than a prescribed length (a several centimeters, for example), it is determined that the part is a "fold line" of the paper currency and is not contaminated, and no processing is performed in particular.

When it is determined that the part is not a "fold line" in step S7, then, it is determined that the part is contaminated. In such a case, it is determined in step S8, based on the amount of contamination and the position thereof, whether the fed paper currency should be rejected or not. In other words, when the amount of contamination is large or when a paper currency is contaminated in a critical part (step S8: No), the authenticity of the paper currency cannot be determined, and therefore the fed paper currency is rejected. The critical part of a paper currency is a part where technologies such as a watermark, a hologram, a security thread, braille, pearl ink, a latent image pattern, special luminous ink, and a watermark barcode are used. The processing when the determination of step S8 is "No" varies from nation to nation.

When it is determined that the amount of contamination of the fed paper currency is not large (step S8: Yes), in order to enhance the accuracy of the authenticity determination of the paper currency, the image of the contaminated region is further corrected (inversion correction or additional correction) in step S9. Details of the processing in step S9 are explained later with reference to FIG. 6A and FIG. 6B.

Figure 5:
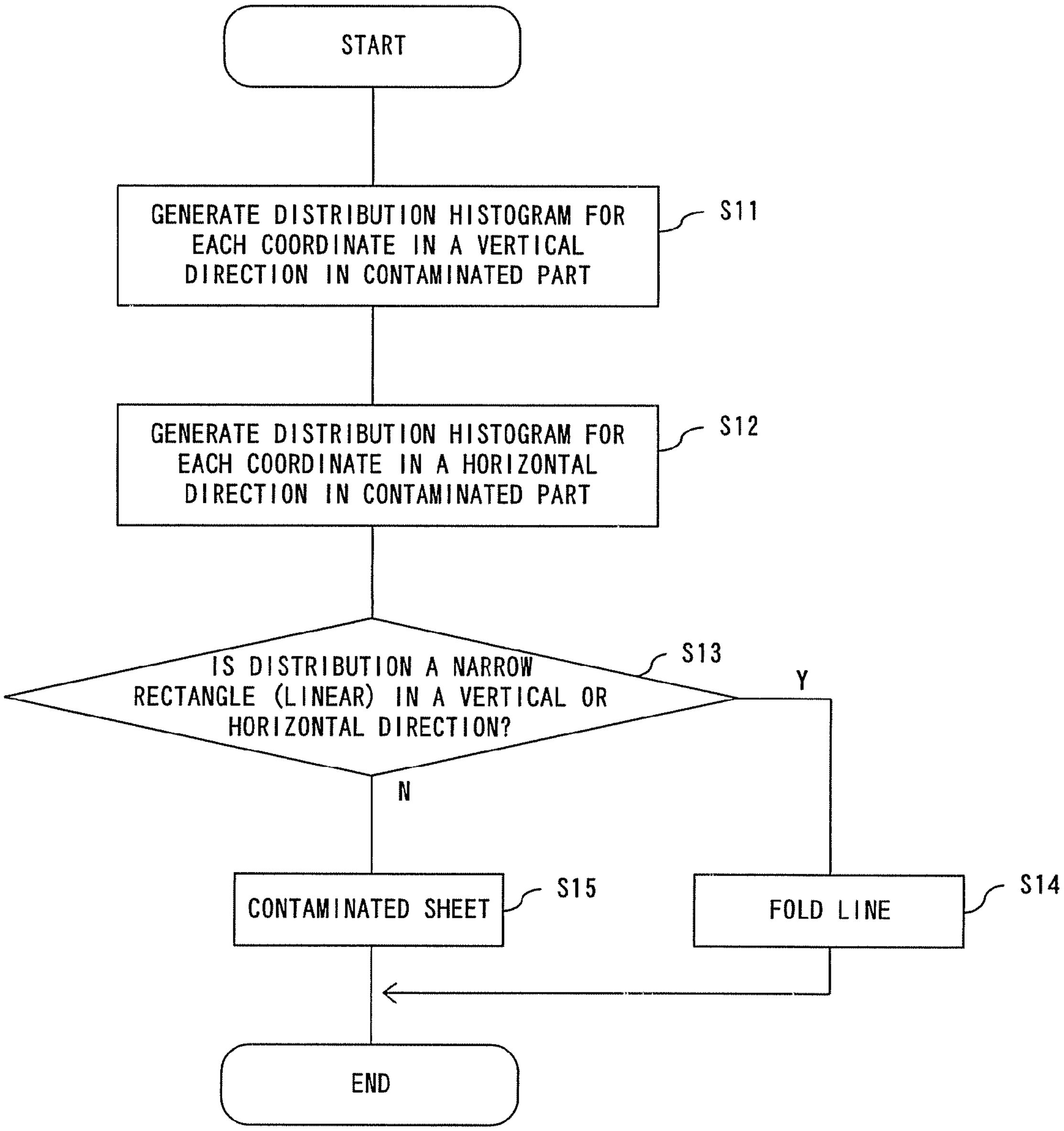
FIG. 5 is a detailed flowchart of processing for determining whether a part is a fold line or not.

FIG. 5 is a detailed flowchart of processing, which is one of the above processes to determine the state of a paper sheet, determining whether a part is a fold line or not in step S7. The processing to determine whether a part is due to "contamination" or due to a "fold line of the paper currency" for the part where a difference between the template data and the corrected data is detected is explained with reference to FIG. 5.

In step S11, for a part where the difference is detected in the above step S6, an output distribution for each coordinate in the vertical direction of the paper currency is generated. In step S12, for the direction orthogonal to the direction in step S11 (a horizontal direction in the present embodiment), an output distribution is generated in the same way. In step S13, it is determined whether the output distributions of the two (vertical and horizontal) directions are linear or not. When the distribution is linear, the part is determined to be a fold line, and the processing is terminated. When the distribution is not linear, the part is determined to be contaminated, and the processing is also terminated.

Figure 6A:
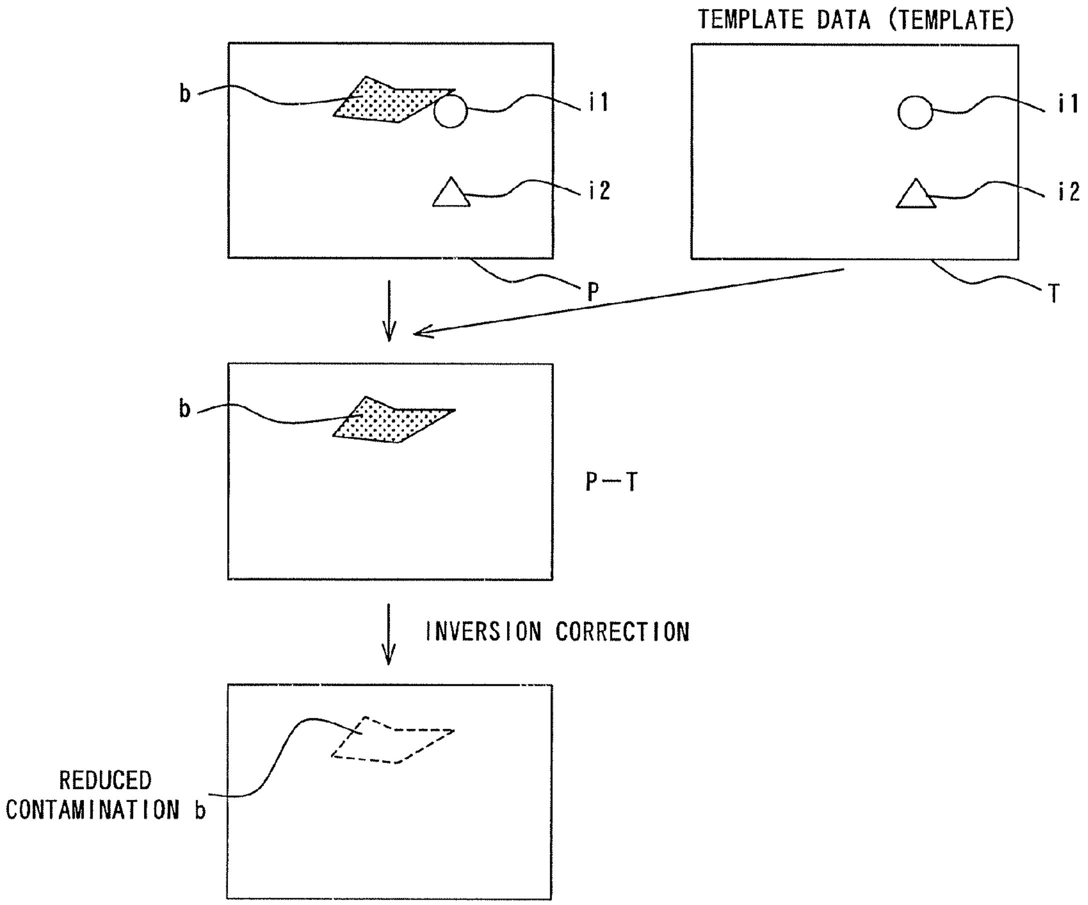
FIG. 6A is a diagram (1) explaining an image processing method for determining the authenticity of a paper currency.
Figure 6B:
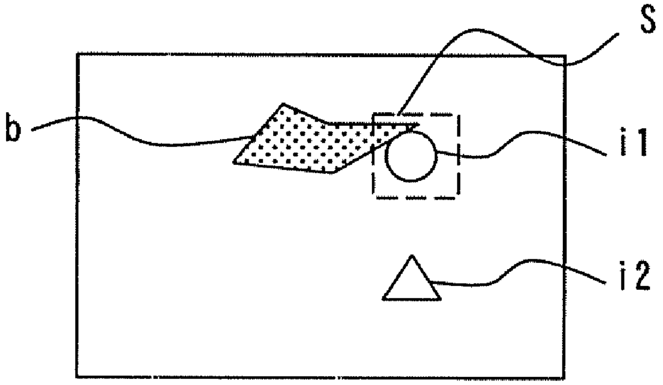
FIG. 6B is a diagram (2) explaining an image processing method for determining the authenticity of a paper currency.

According to the paper sheet processor 1 relating to the present embodiment, further determination of the authenticity of a paper sheet is performed for a paper sheet, which is determined to have contamination of a lower amount than the predetermined amount by the above series of processing. FIG. 6A and FIG. 6B are diagrams explaining an image processing method for determining the authenticity of a paper currency. Processing, in which the paper sheet processor 1 relating to the present embodiment determines the authenticity of a paper currency based on information obtained from the above correction method is explained with reference to FIG. 6A and FIG. 6B.

In FIG. 6A, the fed paper currency comprises images i1 and i2. Here, the images i1 and i2 are, for example, designs drawn on the paper currency. Assume that a template of image data of the paper currency is prepared as template data T in advance. Corrected data P is image data of the fed paper currency obtained by steps S4-S5 in FIG. 4. Suppose the fed paper currency has a contamination b.

First, as explained with reference to FIG. 3, in order to find the position and the gradation of the contamination of the corrected data P based on the fed paper currency, the difference between the corrected data P and the template data T is calculated for each corresponding pixel. Here, the difference between the corrected data P and the template data T (P−T) for a region (pixel) which is not contaminated should be "zero". Meanwhile, for a region which is contaminated the difference depends on the degree of the contamination. Specifically, the difference value increases as the degree of the contamination increases. The "fold line of a paper currency" is ignored here. In such a manner, by calculating the difference data (P−T) of the fed paper currency, information of the position and the intensity of the contamination on the paper currency can be obtained.

Next, inversion correction for reducing the contamination b of the image data is performed. The inversion correction is processing for multiplying the corrected data P corresponding to the area at the position of the contamination b by a coefficient according to the intensity of the contamination (i.e. the amount of difference). By performing the inversion correction, the contamination b is substantially reduced. Therefore, by comparison of the data after the inversion correction with the template data, the accuracy of the authenticity determination of a paper currency is improved.

The calculation of the amount of contamination is performed after recognizing the denomination of the paper currency, and thus, it is possible to detect the contamination in a particular area of the paper currency. For example, as shown in FIG. 6B, it is also possible to detect contamination in an area where a portrait is drawn on a paper currency.

As described above, according to the paper sheet processor relating to the present embodiment, image data of a whole paper currency is corrected on the basis of an area, which is less subject to the contamination etc. Because the reference is an area, which is less subject to the contamination etc., by comparing the corrected image data and the template data and by taking the difference between two, the amount and the position of the contamination on the paper currency is acquired with further accuracy in units of pixels. In addition, because the position where the difference between the corrected image data and the template data is present is accurately acquired, it is possible to determine the distinction between a contamination and a fold line, and to process a paper currency in an appropriate manner. Moreover, from the acquired position and the amount of the contamination, by removing the contaminated part from the image data, and the accuracy of the authenticity determination of a paper currency can be improved.

What is claimed is:

1. A paper sheet processing apparatus with a function for determining a state of a paper sheet, comprising:
- an optical sensor to generate gradation data by optically reading the state of an input paper sheet;
- storage unit to store template gradation data of the paper sheet;
- correction unit to generate an output distribution as a histogram of each blank area of a plurality of blank areas in the paper sheet from the gradation data obtained by the optical sensor, to select a blank area where a value of the gradation data is highest as correction reference, and to correct the gradation data of the whole paper sheet based on the gradation data of the selected blank area; and
- state determination unit to determine the state of the whole paper sheet based on the comparison of the corrected gradation data and the template gradation data.

2. The paper sheet processing apparatus according to claim 1, wherein the correction unit calculates a correction coefficient so that the gradation data of the selected bank area in the paper sheet obtained by the optical sensor corresponds to a predetermined reference value, and multiplies the correction coefficient with the gradation data of the whole paper sheet.

3. The paper sheet processing apparatus according to claim 2, wherein the template gradation data is generated from an unused paper sheet by the optical sensor, and the state determination unit determines a contamination of the paper sheet by taking the difference between the template gradation data and the corrected gradation data of an infinitesimal area unit.

4. The paper sheet processing apparatus according to claim 3, wherein, when an area where the gradation data obtained from the correction is darker than the template gradation data, is approximately linear and is longer than a prescribed length, the state determination unit determines that the area constitutes a fold line of a paper sheet.

5. The paper sheet processing apparatus according to claim 3 further comprises:
- calculation unit to calculate the amount of contamination based on the determination of the state determination unit; and
- processing determination unit to determine whether the paper sheet should be recovered or not based on the calculated amount of contamination.

6. The paper sheet processing apparatus according to claim 5 further comprises:
- additional correction unit to correct gradation data of a contaminated area detected based on the determination of the state determination unit; and
- authenticity determination unit to determine authenticity of the paper sheet based on gradation data corrected by the additional correction unit.

7. A paper sheet processing method, which allows determination of a state of a paper sheet, comprising:
- generating gradation data by optically reading the state of an input paper sheet;
- generating an output distribution as a histogram of each blank area of a plurality of blank areas in the paper sheet from the gradation data obtained by the optical sensor;
- selecting a blank area where a value of the gradation data is highest as correction reference;
- correcting, by a processing unit, the gradation data of the whole paper sheet based on the gradation data of the selected blank area in the paper sheet; and
- determining the state of the paper sheet based on comparison of the corrected gradation data with the prepared template gradation data.

* * * * *

UNITED STATES PATENT AND TRADEMARK OFFICE

CERTIFICATE OF CORRECTION

PATENT NO. : 7,840,056 B2
APPLICATION NO. : 11/275022
DATED : November 23, 2010
INVENTOR(S) : Masanori Mukai It is certified that error appears in the above-identified patent and that said Letters Patent is hereby corrected as shown below:

Cover page, col. 2, line 1, (Other Publications), delete “Japanes” and insert -- Japanese --.

Signed and Sealed this
Twenty-ninth Day of March, 2011

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,840,056 B2
APPLICATION NO. : 11/275022
DATED : November 23, 2010
INVENTOR(S) : Masanori Mukai It is certified that error appears in the above-identified patent and that said Letters Patent is hereby corrected as shown below:

Column 8, Line 19 in Claim 2, delete "bank" and insert -- blank --, therefor.

Signed and Sealed this
Seventeenth Day of May, 2011

David J. Kappos
*Director of the United States Patent and Trademark Office*